(No Model.)

H. C. BRIDGMAN.
TRICYCLE.

No. 247,156.      Patented Sept. 20, 1881.

Witnesses
Geo. H. Strong.
Frank D. Brook

Inventor
Henry C. Bridgman
By Dewey & Co. Attys

UNITED STATES PATENT OFFICE.

HENRY C. BRIDGMAN, OF MILPITAS, CALIFORNIA.

TRICYCLE.

SPECIFICATION forming part of Letters Patent No. 247,156, dated September 20, 1881.

Application filed July 27, 1881. (No model.)

*To all whom it may concern:*

Be it known that I, HENRY C. BRIDGMAN, of Milpitas, county of Santa Clara, State of California, have invented an Improvement in Tricycles; and I hereby declare the following to be a full, clear, and exact description thereof.

My invention relates to that class of conveyances which are operated by the rider and are known by the general term of "tricycles."

It consists of a peculiar frame, the rear end of which is supported by a steering or guiding wheel, and the forward end by two large wheels, which are propelled by cranks operated by the hands, the seat being so placed as to render this possible. The steering is accomplished by the feet, which are fitted to stirrups connected with the guiding-wheel by means of cords and operated similar to the manner in which racing-boats are guided.

The novelty in the invention consists in so journaling the large driving-wheels as to be independent of each other, so that each can be operated separately to turn corners, and in adapting them to be revolved by the hand.

It further consists in the peculiar frame or body, and in the means for guiding the device.

Figure 1:
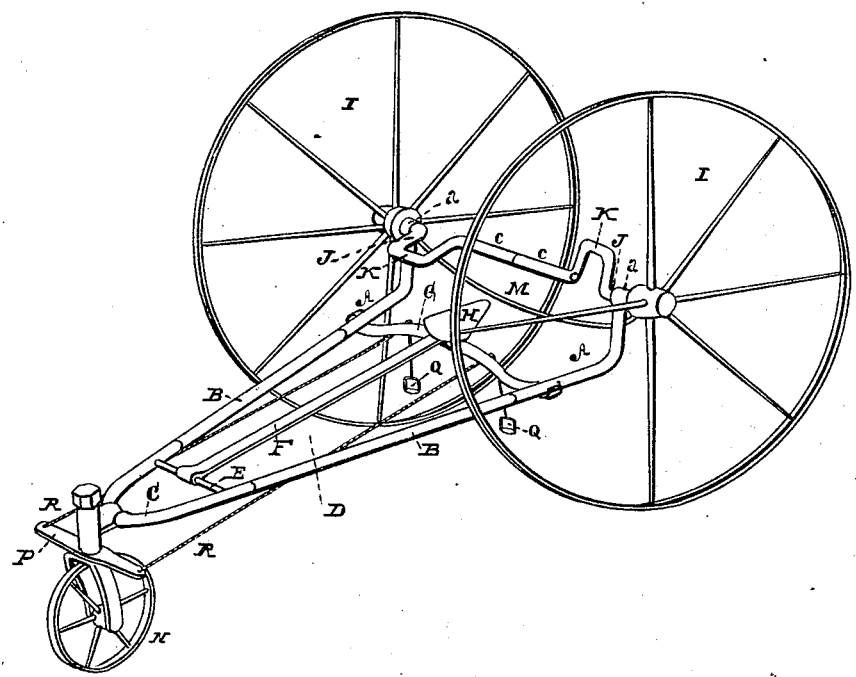
Figure 2:
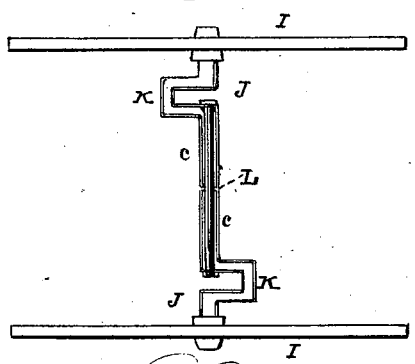

Referring to the accompanying drawings, Figure 1 represents a perspective view of my machine. Fig. 2 shows a top view of wheels and independent axles.

The frame consists of two metal pieces, A, each piece being bent at right angles, and having on top of the upright portion a socket, a, as shown. They are connected with wooden strips B, which fit into and are secured in sockets in their ends, and converge toward the rear, their ends being secured to a bent rod, C. It will be seen that this frame is triangular, and, for convenience in designating it, I mark it D.

E is a transverse bar, secured between the sides of the bent rod C. Upon this bar or rod E, fitting it by a loose bearing, is a strip, F, which extends forward and is supported by the transverse spring G. This spring, at its ends, curves downward and upward outside of the frame, and is secured to it, as shown, thus forming an easy and comfortable spring. Upon the forward end of the strip F is the seat or saddle H.

Let I represent large driving-wheels, made as light as is consistent with strength. They are made fast upon axles J J, which are journaled in the sockets a of the frame. The axles are bent to form cranks K K on each side, and then extend in a straight portion (marked c) to meet each other. They are made hollow to receive a rod, L, which passes inside of both axles through the portion c up to the crank, and the axles meet at the center, but are not joined. The supporting and connecting rod L passes through the axle at the crank and is headed down tight, so that it is secured to and revolves with that axle. It is headed down loosely in the other axle. This forms an axle severed at the center, each side being capable of operating independently of the other. The cranks K are placed in convenient position for the hands of the rider as he sits on the seat. He grasps them with his hands and drives each wheel as he desires, being capable of holding one wheel steady while turning with the other to travel around a corner.

The advantage of a crank-movement operated by hand is that power can be brought to bear during the whole revolution. When operated by the feet each foot can only apply power on the downward stroke, and this power must not only be sufficient to drive the machine, but also to raise the other foot, which is kept on the crank all the time; but by this device I obtain all the advantage of a crank-movement and have no waste, as the power of the arm can be brought to bear on the upward as well as on the downward stroke. Having each wheel independently journaled enables me to practically use the device.

Attached to the upright portions of the rods A is a rod or bar, M, which curves downward in front of the frame. This forms a foot-rest. To the rear of the frame is journaled the guiding-wheel N, upon the same principle as a caster—that is, it is upon a swivel, so as to turn it bodily, and is also journaled in its own frame, to permit its revolution. To its frame is attached a cross-piece, P, to the ends of which are secured cords R, which extend forward to the foot-rest, and are provided with stirrups Q on their ends. The toes of the rider fit into these stirrups, as his feet are upon the foot-rest, and he can thus turn the guide-wheel to steer the machine.

I am aware that machines have been propelled by the hands by means of levers, either operating cranks or clutch mechanisms. I do not claim such, broadly; but What I do claim as new, and desire to secure by Letters Patent, is—

1. In a tricycle, the triangular body or frame D, consisting of the outward bearings, A, with their sockets $a$, the converging side pieces, B, and the bent rod C, in combination with the supports E and F, saddle H, and spring G, when arranged substantially as and for the purpose herein set forth.

2. In a tricycle having a supporting-frame, the driving-wheels I, made fast upon separate axles J J, journaled in the frame, and having hand-cranks K formed upon them, and their meeting ends fitting over a connecting and supporting rod, L, whereby they may be turned independently, substantially as herein described.

3. In combination with the triangular frame D, constructed substantially as shown, and having a guide-wheel, N, the driving-wheels I, with their independent separate axles J, having their meeting ends fitting over a connecting and supporting rod, L, and the cranks K, adapted to be revolved from the frame by the hands of the rider, whereby the wheels I may be turned independently, substantially as herein described.

In witness whereof I have hereunto set my hand.

HENRY C. BRIDGMAN.

Witnesses:
M. M. PIXLEY,
O. WHITLOCK.